United States Patent [19]

Helton

[11] Patent Number: 4,750,785

[45] Date of Patent: Jun. 14, 1988

[54] TRUSS TRANSPORTATION TRAILER

[76] Inventor: Jesse D. Helton, Box 361, Crocker, Mo. 65452

[21] Appl. No.: 64,833

[22] Filed: Jun. 22, 1987

[51] Int. Cl.⁴ .......................... B60P 1/04; B60P 1/28; B60P 3/40
[52] U.S. Cl. .................................. 298/8 R; 280/400; 280/404; 298/18; 414/10; 414/546
[58] Field of Search .................. 280/400, 404, 405 R, 280/405 A, 406, 407; 414/10, 546, 548; 298/8 R, 18

[56] References Cited

U.S. PATENT DOCUMENTS 3,091,498  5/1963  Goodwin ........................... 298/8 R Primary Examiner—John J. Love
Assistant Examiner—Mitchell J. Hill
Attorney, Agent, or Firm—Edward R. Weber

[57] ABSTRACT

A unique truss transportation trailer which provides a truss support trailer that may be easily and safely controlled by a single operator and which can be utilized to transport a large variety of truss sizes and configurations safely from the point of manufacture to the point of use.

6 Claims, 3 Drawing Sheets

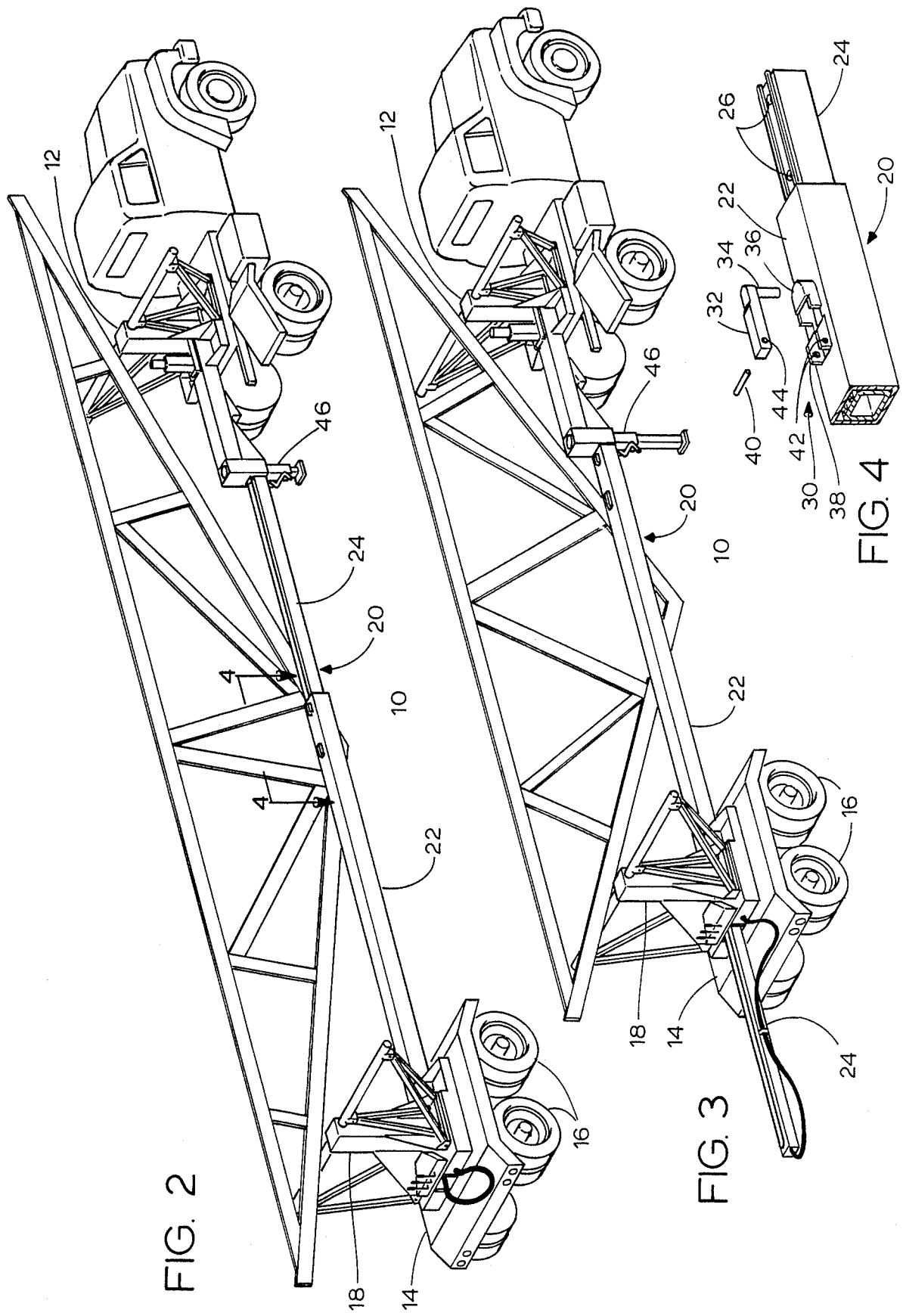

TRUSS TRANSPORTATION TRAILER

FIELD OF THE INVENTION

The present invention relates to a trailer for hauling prefabricated roof trusses, and more particularly, to a trailer which incorporates power assisted devices and safety devices to permit a single operator to adapt the trailer to accommodate various sizes of trusses and to safely operate the trailer when unloading said trusses.

BACKGROUND OF THE INVENTION

Increased building costs and improvements in the ability to construct effective roof trusses have resulted in an increasing use of prefabricated roof trusses in the construction of both commercial and residential buildings. Roof trusses, which are assembled at a manufacturing facility, are moved to the job site most commonly on a tractor-trailer operated on the highway system. Because of the differing requirements of the buildings, the dimensions and configurations of the trusses vary marketedly from building to building. As a result, the trailers utilized to transport the trusses must be capable of adaptation in order to handle the various sizes and configurations of trusses which may be fabricated in a single manufacturing plant.

Conventional tractor-trailer combinations for moving trusses consist of a standard over-the-road tractor equipped with a "fifth wheel" coupler by which a trailer may be connected to the tractor. A first bolster is mounted above the trailer portion of the "fifth wheel" coupler to support the front end of the trusses. An independent rear trailer is equipped with a similar bolster to support the rear end of the trusses. The independent trailer/bolster assembly is connected to the "fifth wheel" coupling mechanism through a pipe structure. The distance between the front bolster and the rear bolster may be adjusted by moving the trailer along a cylindrical pipe which serves as the backbone of the truck. In cases where the trusses have a high pitch or are very long, a vertical extension may be added to the front and rear bolsters to increase the height thereof so that longer or deeper trusses may be carried on the tractor-trailer without the apex of the truss dragging on the ground.

Adapting the trailers for various sizes of trusses is quite labor intensive. Adjusting the distance between the front and rear bolsters usually requires two people; one person to drive the tractor and one person to signal the driver when locking holes are lined up in the pipe structure. Several men are required to carry the vertical extension bolsters and mount them on the truck when increased height is needed. If the tractor breaks down, it becomes necessary to unload the trusses before the tractor can be moved away from the trailer and a new tractor connected. This process as well requires numerous men to effect.

Another problem with conventional tractor-trailer combinations is the inability to adjust the height of the load after the trusses are mounted. This can create an extreme safety hazard. In one known instance, a tractor-trailer carrying trusses attempted to cross a railroad grade crossing. The clearance was such that the trusses grounded on the center of the grade and effectively "hung up" the tractor-trailer combination. Before the tractor-trailer could be moved from the railroad crossing, it was necessary to get additional equipment to unload the trusses. Obviously if a train had arrived in the meantime, the results could have been disastrous.

Accordingly one object of the instant invention is to provide a trailer which is capable of standing alone in a loaded condition. A further object of the invention is to provide a trailer which may be adjusted in length by one man. Yet another object of the instant invention is to provide a trailer which can be adjusted in height in either the loaded or unloaded condition. These and other objects and advantages of the present invention will be in part apparent and in part pointed out hereinafter.

BRIEF DESCRIPTION OF THE DRAWINGS

When considering the following detailed description in conjunction with the drawings.

FIG. 2 is a similar drawing of the trailer of the instant invention in its lenthened state.

FIG. 3 shows the trailer of the instant invention in the shortened state.

FIG. 4 is a close-up view of the unique length locking device taken along lines 3—3 of FIG. 1

DETAILED DESCRIPTION OF THE INVENTION

Figure 1:
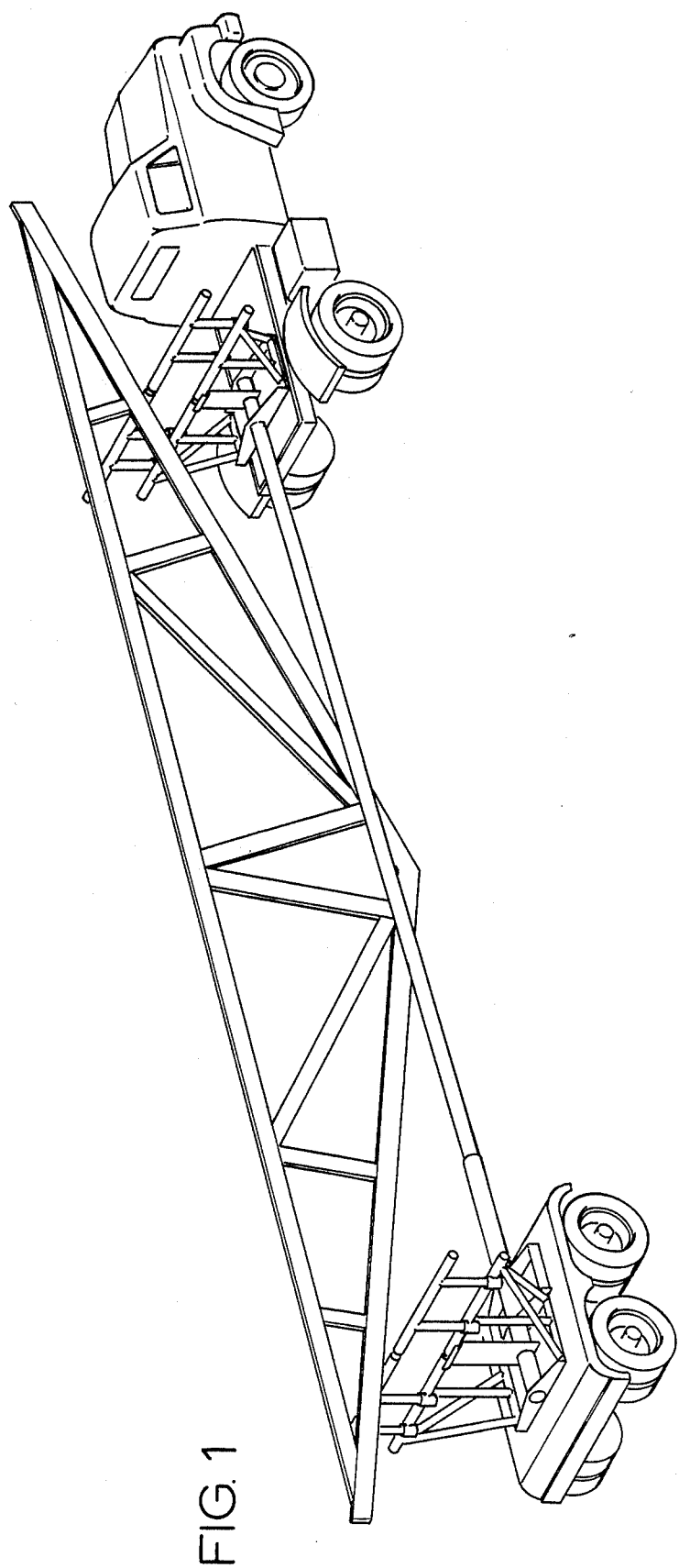
FIG. 1 is a pictorial drawing showing a conventional tractor-trailer arrangement.

Referring now to the drawings wherein like reference characters represent like elements, FIG. 2 shows a trailer generally designated as 10 comprised of a front truss supporting bolster 12, which is fitted with a conventional fifth wheel attachment mechanism (not shown), and a rear trailer assembly 14 comprised of a conventional wheel and axle mechanism 16 and a rear bolster 18. Rear trailer assembly 14 is connected to front truss supporting bolster 12 by an extendable/retractable box beam 20. Comparing FIG. 2 and FIG. 3, it will be seen that rear trailer assembly 14 can be moved closer or farther away from front truss supporting bolster 12 by positioning it along various locations along extendable/retractable box beam 20.

FIG. 4 illustrates in greater detail a portion of the components of extendable/retractable box beam 20. As will be seen, extendable/retractable box beam 20 is composed of an outer box beam 22 in sliding relationship with an inner box beam 24. Sleeved holes 26 are provided at intervals along inner box beam 24, the purpose of which will become apparent. Outer box beam 22 is provided with a positive lock mechanism 30 consisting of a lock retainer 36 and a lock safety 38. Outer box beam 22 is additionally slotted in the area defined by lock retainer 36 and lock safety 38 so that free access may be obtained to inner box beam 24 in this area. The combination inner box beam/outer box beam assembly is further provided with a means for moving outer box beam 22 in relationship to inner box beam 24. This means (not shown) may be of any of the conventional structures known, such as an hydraulic cylinder, an electric motor, an electric chain winch, an endless chain mechanism, or any other conventional structure suitable for moving one piece laterally in relationship to a second piece. Positive lock mechanism 30 further consists of a lock body 32 fitted with lock bar 34. The relationship of the various components will become apparent as the means of adjusting the length of the trailer is described.

To adjust the length of the trailer, the operator parks the tractor-trailer combination, sets the brake on the tractor, and turns off the engine. He then removes a control mechanism (not shown), which includes means for operating the power means which adjusts the length of expandable/retractable box beam 20. He then unlocks the beams. This procedure is the exact opposite of that hereinafter described for locking the beams and will be fully understood from reading that description. As inner box beam 24 moves in relationship to outer box beam 22, one of a plurality of holes 26 will periodically appear in the slot cut in outer box beam 22, the perimeter of which is defined by lock retainer 36 and a lock safety 38. Holes 26 are sleeved and are sized to slidably engage lock bar 34. When the desired separation between front bolster 12 and rear bolster 18 has been attained, the operator adjusts the length so that one of holes 26 appears in the aforementioned slot. Positive lock 30 is then placed within lock retainer 36 so that lock bar 34 engages the selected hole 26. The relationship of outer box beam 22 and inner box beam 24 is then further adjusted so that the end of positive lock 30, immediately over lock bar 34, passes into the covered recess created by lock retainer 36. At this point, it will be noted that the relationship of outer box beam 22 and inner box beam 24 is now fixed. Due to the covered recess in lock retainer 36, it would be impossible to remove positive lock 30. As an additional safety feature to prevent decoupling of this relationship, locking safety pin 40 is passed through hole 42 in lock safety 38 and hole 44 in lock body 32. Locking safety pin 40 can be retained in position by use of a cotter pin, hair pin, or any of the numerous devices commonly used to retain a pin in place.

Front bolster 12 is further provided with a front trailer support 46, which may be extended or retracted by any of the various conventional means. When front trailer support 46 is extended so that it makes contact with the ground, front bolster 12 may be sufficiently raised to permit the fifth wheel mechanism to be disengaged, thus allowing the tractor to be moved away from the trailer. This is particularly advantageous in the event of a breakdown of the tractor as it permits a substitute tractor to be attached to the trailer assembly without the need for removing the load. The ability to utilize front trailer support 46 to support the front end of the trailer when in a loaded condition is a result of the rigidity furnished by the mated inner and outer box beams. Where a cylindrical structure is utilized, as on conventional trailers, sufficient lateral stability is not provided and any attempt to support the front bolster results in a twisting whereupon the trusses on one side or the other of the trailer are permitted to slide onto the ground.

Figure 5:
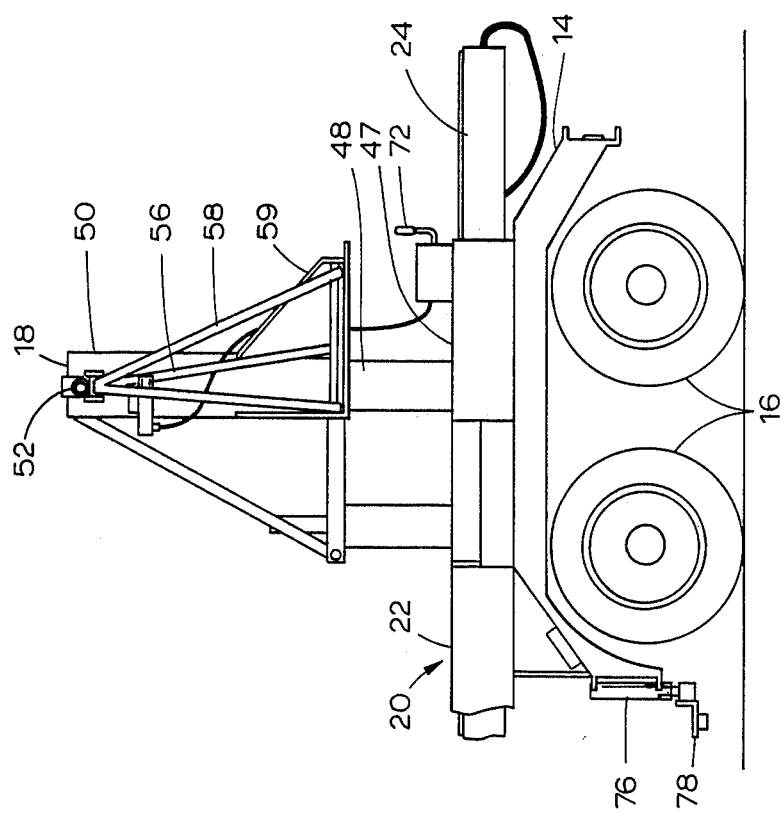
FIG. 5 is a partial view of the truss trailer showing the rear trailer assembly and the truss carrying bolster from the side.
Figure 6:
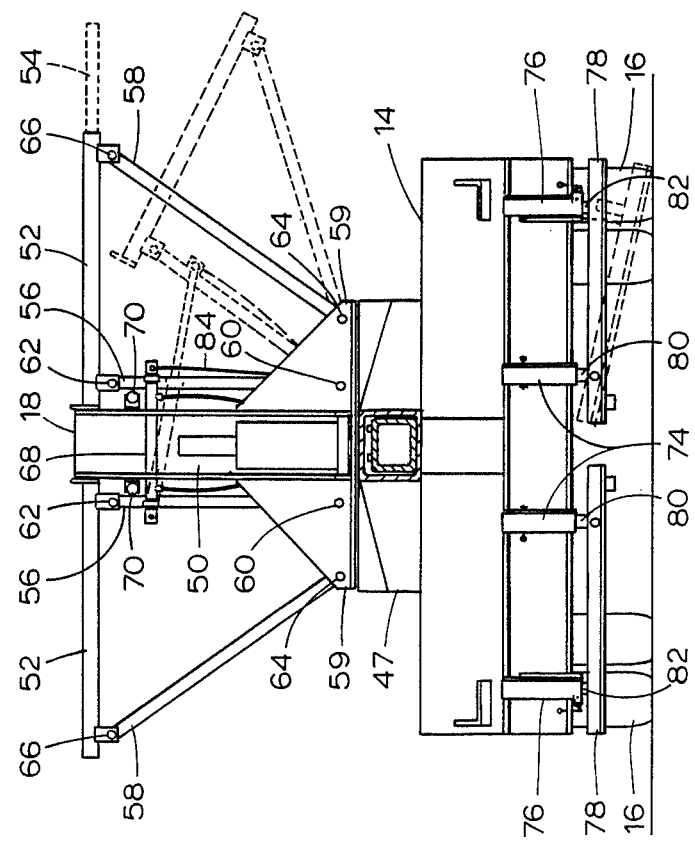
FIG. 6 is a view of FIG. 5 from the tractor looking towards the rear of the assembly.

Considering now FIGS. 5 and 6, the unique construction of the bolster assembly will be described. The front and rear bolsters are identical; the front bolster being mounted above the fifth wheel connection mechanism and the rear bolster being mounted upon rear trailer assembly 14. The bolsters consist of a bolster base 47, which is mounted directly upon rear trailer assembly 14 or the fifth wheel connection device and is strongly braced so as to rigidly support inner bolster riser 48 which is perpendicular to bolster base 47. Outer bolster riser 50 surrounds inner bolster riser 48 in slidable engagement. Outer bolster 50 and inner bolster riser 48 are so sized and constructed as to permit outer bolster riser 50 to move freely along inner bolster riser 48 without any tipping or twisting occurring.

Affixed to outer bolster riser 50 are left and right truss support mechanisms. These mechanisms are mirror images of each other. Each mechanism is comprised of truss support 52, which may be optionally equipped with an extension 54 to increase the number of trusses which may be carried. Truss support 52 is attached to outer bolster riser 50 by inner truss support riser 56 and outer truss support riser 58. These truss support risers are fastened to outer bolster riser 50 via outer bolster riser pivot plate 59, which is rigidly affixed to outer bolster riser 50. Inner truss support riser 56 is affixed to outer bolster riser pivot plate 59 at inner truss support riser lower pivot point 60 and to truss support 52 at inner truss support riser upper pivot point 62. Likewise, the outer truss support riser is affixed to the bolster riser pivot plate at outer truss support riser lower pivot point 64 and to truss support 52 at outer truss support riser upper pivot point 66. It will be noted in FIG. 6 that when truss support 52 is in its carrying position, inner truss support riser 56 is essentially perpendicular to truss support 52 and parallel to outer bolster riser 50. It will be further noted that outer truss support riser upper pivot point 66 is near the outer end of truss support 52, whereas outer truss support riser lower pivot point 64 is substantially closer to inner truss support riser lower pivot point 60. This results in outer truss support riser 58 being appreciably longer than inner truss support riser 56 and creates a diagonal brace to support the outer end of truss support 52.

The positioning of the left and right truss support assemblies is controlled by a truss support control cylinder 68 and left and right locking mechanisms 70. Truss support cylinder 68 is a double acting hydraulic cylinder which is activated by a control 72 which selectively lowers or raises either the left-hand truss support 52 or the right-hand truss support 52. Each locking mechanism 70 is rigidly attached to outer bolster riser 50 and comprises a spring loaded plunger (not shown) which engages inner truss support riser 56 so as to lock it in a vertical position and lock truss support 52 in an horizontal load supporting position. Locking mechanism 70 further comprises a solenoid device which can be activated to withdraw the plunger and thus release inner truss support device 56 from its locked vertical position. When it is desired to unload the trusses carried upon truss support 52, a switch is activated adjacent to control handle 72. This switch will energize both solenoids on either the left-hand side or the right-hand side of the vehicle thus releasing both the front and rear truss support mechanisms on either the left side or right side of the truss support trailer. Control handle 72 is then moved in a direction that activates truss support cylinder 68. Truss support cylinder 68 will elongate and slowly cause inner truss support riser 56 and outer truss support riser 58 to pivot about their respective lower pivot points and thus move truss support 52. As a result of the spacing of the inner and outer truss support lower pivot points 60 and 64, respectively, and the difference in length of inner truss support riser 56 and outer truss support riser 58, a unique unloading action occurs in that truss support 52 will move laterally away from the vehicle before the outer end begins to lower towards the ground. This has the effect of moving the trusses outward from the vehicle so that when they slide from truss support 52 and fall onto the ground, their inner most end will be outside of the tread width of the trailer and thus permit the trailer to be driven away without the necessity of moving the trusses. Following the unloading of the trusses, control handle 72 is then moved in the opposite direction. Hydraulic cylinder 68 retracts and returns truss support 52 to its raised horizontal position and locking mechanism 70 automatically activates and locks the support in this position. Because of the use of the double acting power cylinder, it is possible to raise truss support 52 to its horizontal position even when a load is on the truss support. Thus it is possible to unload only part of the trusses carried on the truss support. This is accomplished by firmly chaining the inner trusses to truss support 52 and inner truss support riser 56. When the cylinder is activated, truss support 52 tilts until the unrestrained outer trusses slide to the ground. When hydraulic cylinder 84 is further retracted, the inner trusses, which have been chained to truss support 52, and inner truss support riser 56 are returned to the carrying position along with truss support 52.

Additional control devices, which are not shown, can also be provided in the vicinity of control handle 72 which will permit selective raising and lowering of the outer bolster riser with respect to the inner bolster riser at either the front end or rear of the trailer. This is most conveniently accomplished with an hydraulic cylinder mounted upon inner bolster riser 48 The cylinder or other lifting device will have sufficient power to raise and lower the outer bolster riser even when a full load of trusses is carried on truss support 52.

It is thus seen that it is possible to carry the trusses with a minimum amount of ground clearance when the trailer is operating on a smooth surface and it is possible to to increase the ground clearance by raising the outer bolster risers when carrying the trusses over rough ground or over humps in the road, such as might be encountered at a railroad grade crossing, where the trusses may drag on the ground and hang up the trailer.

On occasion the building which is being constructed will require trusses which are angled only on one side. These are commonly called mono trusses. To handle the mono trusses, rear trailer assembly 14 is equipped with steps to support the apex of the mono truss. This step mechanism consists of an inner mono step support 74 and an outer mono step support 76, which are rigidly affixed to rear trailer assembly 14. The support mechanism itself consists of a mono step 78 to which are pivotally affixed an inner leg 80 and an outer leg 82. The inner and outer legs are sized to slidably fit within inner mono step 20 support 74 and outer mono step support 76. When the mono step is mounted on the trailer, inner leg 80 is firmly supported within inner mono step support 74. Outer leg 82 is releasably supported within outer mono step support 76. For over-the-road hauling, the trusses are loaded with the apex resting upon the mono step. At the building site, mono step control cable 84 is connected to the point where truss support control cylinder 68 is attached to inner truss support riser 56. Mono step control cable 84 is flexible and of sufficient strength to hold the outer end of mono step 78 in its raised position. Once mono step cable 84 is attached, the lock on outer leg 82 may be released. The controls are then activated in the same fashion as would be done for unloading a load of full trusses. As rear truss support 52 is lowered to the unloading position, mono step control cable 84 will in turn lower mono step 78 to an unloading position, thereby allowing the mono trusses to slide to the ground in the same fashion as full trusses.

It is thus seen that the unique truss transportation trailer of the instant invention provides a truss support trailer which may be easily and safely controlled by a single operator and which can be utilized to transport a large variety of truss sizes and configurations safely from the point of manufacture to the point of use. Although the present invention has been described with reference to a particular detailed embodiment thereof, it should be understood that the description is intended to be illustrative and not in a limiting sense. Many other variations may be devised by those skilled in the art which will fall within the true spirit and scope of the principles of this invention.

What is claimed is:

1. A trailer assembly suitable for hauling pre-manufactured trusses consisting of: (1) a front bolster assembly comprising a means for attaching the trailer to the fifth wheel of a conventional tractor, a bolster base mounted thereon, an inner bolster riser mounted upon said bolster base, an outer bolster riser slidably surrounding said inner bolster riser, left and right truss supports mounted on the left and right sides of said outer bolster riser, each of which consists of a bolster riser pivot plate rigidly mounted to said outer bolster riser, an inner truss support riser having a first end pivotally mounted to said bolster riser pivot plate adjacent to said outer bolster riser and a second end remote therefrom, an outer truss support riser longer than said inner truss support riser having a first end pivotally mounted to said bolster riser pivot plate at a point separated from the point where the inner truss support riser is pivotally attached and a second end remote therefrom, a truss support having a first end pivotally attached to said second end of said inner truss support riser and a second end pivotally attached to said second end of said outer truss support riser whereby the differential length of said inner truss support riser and said outer truss support riser when they are rotated around their respective pivot points in the bolster riser pivot plate causes said truss support to move laterally away from said outer bolster riser before any significant angular change of said truss support with respect to said outer bolster occurs, locking means to hold said inner truss support riser in parallel relationship with said outer bolster riser, and power means for causing said inner and outer truss support risers to rotate around their respective pivot points in said bolster riser pivot plate and thus cause said truss support to move from an horizontal, truss-supporting position to an angled, truss-unloading position, said power means also acting to return said truss supports from said angled position to said horizontal position; (2) a rear trailer comprising a wheel and axle mechanism, a bolster base mounted thereon, an inner bolster riser mounted upon said bolster base, an outer bolster riser slidably surrounding said inner bolster riser, left and right truss supports mounted on the left and right sides of said outer bolster riser, each of which consists of a bolster riser pivot plate rigidly mounted to said outer bolster riser, an inner truss support riser having a first end pivotally mounted to said bolster riser pivot plate adjacent to said outer bolster riser and a second end remote therefrom, an outer truss support riser longer than said inner truss support riser having a first end pivotally mounted to said bolster riser pivot plate at a point separated from the point where the inner truss support riser is pivotally attached and a second end remote therefrom, a truss support having a first end pivotally attached to said second end of said inner truss support riser and a second end pivotally attached to said second end of said outer truss support riser whereby the differential length of said inner truss support riser and said outer truss support riser when they are rotated around their respective pivot points in the bolster riser pivot plate causes said truss support to move laterally away from said outer bolster riser before any significant angular change of said truss support with respect to said outer bolster riser occurs, locking means to hold said inner truss support riser in parallel relationship with said outer bolster riser, and power means for causing said inner and outer truss support risers to rotate around their respective pivot points in said bolster riser pivot plate and thus cause said truss support to move from an horizontal, truss-supporting position to an angled, truss-unloading position, said power means also acting to return said truss support from said angled position to said horizontal position; and (3) said rear trailer being connected to said front bolster assembly by an extendable/retractable mechanism comprising an outer box beam slidably surrounding an inner box beam, means for changing the lateral relationship between said inner box beam and said outer box beam so as to shorten or lengthen the distance between said rear trailer and said front bolster assembly, and a positive means for locking the relative position of the outer box beam and the inner box beam so as to maintain the distance between said rear trailer and said front bolster assembly.

2. A truss trailer assembly according to claim 1 wherein the extendable/retractable box beam is equipped with a locking device consisting of a plurality of sleeved holes in said inner box beam, a slot in said outer box beam, an enclosed pocket over the forward portion of said slot, which pocket has an opening towards the rear portion of said slot, vertical plates at either side of the rear of said slot, said plates having a hole therein which holes have a common axis, a locking member consisting of a lock pin, sized to slidably engage one of the sleeved holes in said inner box beam, and a lock bar, sized to mate with said pocket overlying the forward portion of said slot in said outer box beam, said lock bar having a hole transverse therethrough whereby when said lock pin is engaged with one of the holes in the inner box beam and said lock bar is mated within said pocket, a pin may be inserted through the hole in one of the vertical plates, the hole in the lock bar, and the hole in the second lock plate whereby the locking member is held rigidly engaged with the inner box beam and the inner and outer box beam are prevented from movement with respect to each other.

3. A truss trailer assembly according to claim 1 wherein means is provided for moving said outer box beam laterally along said inner box beam.

4. A truss trailer assembly according to claim 1 wherein said front and said rear bolster assemblies are equipped with means for raising and lowering said outer bolster riser in relationship to said inner bolster riser.

5. A truss trailer assembly according to claim 4 wherein said means is an hydraulic cylinder.

6. A truss trailer assembly according to claim 1 equipped with a step device attached to the forward end of said rear trailer whereby mono trusses can be hauled on said trailer, said step device consisting of a member having a first end pivotally attached to said trailer at its inner end and a second end flexibly attached to said inner truss support riser whereby when said inner truss support riser is caused to rotate about its lower pivot point from its hauling position to its unloading position, the outer end of said member is lowered from a horizontal, hauling position to an angled, unloading position.

* * * * *